United States Patent
Hui et al.

(10) Patent No.: US 12,328,536 B2
(45) Date of Patent: Jun. 10, 2025

(54) DATA ACCESS METHOD AND APPARATUS, CHIP AND COMPUTER STORAGE MEDIUM

(71) Applicant: SANECHIPS TECHNOLOGY CO., LTD., Shenzhen (CN)

(72) Inventors: Ru Hui, Shenzhen (CN); Hengqi Liu, Shenzhen (CN); Hong Jiang, Shenzhen (CN); Yi Wang, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 260 days.

(21) Appl. No.: 18/002,316

(22) PCT Filed: Apr. 28, 2021

(86) PCT No.: PCT/CN2021/090736
§ 371 (c)(1),
(2) Date: Dec. 19, 2022

(87) PCT Pub. No.: WO2021/253999
PCT Pub. Date: Dec. 23, 2021

(65) Prior Publication Data
US 2023/0353910 A1 Nov. 2, 2023

(30) Foreign Application Priority Data

Jun. 18, 2020 (CN) .......................... 202010561037.7

(51) Int. Cl.
*H04Q 11/00* (2006.01)
(52) U.S. Cl.
CPC ..... *H04Q 11/0062* (2013.01); *H04Q 11/0005* (2013.01); *H04Q 2011/0033* (2013.01)
(58) Field of Classification Search
None
See application file for complete search history.

(56) References Cited

U.S. PATENT DOCUMENTS

| 6,856,719 B2 | 2/2005 | Wang et al. |
| 2010/0272438 A1* | 10/2010 | Conklin ................ H04J 3/1652 398/58 |

(Continued)

FOREIGN PATENT DOCUMENTS

| CN | 1581013 A | 2/2005 |
| CN | 101039210 A | 9/2007 |

(Continued)

OTHER PUBLICATIONS

OTN Over Packet Fabric Protocol (OFP) Implementation Agreement; IA # OIF-OFP-01.0, Nov. 2011 [online], [retrieved on Oct. 28, 2024]; retrieved from the Internet <URL: https://www.oiforum.com/wp-content/uploads/2019/01/oif-ofp-01.0.pdf> (Year: 2011).*

(Continued)

*Primary Examiner* — Nathan M Cors
(74) *Attorney, Agent, or Firm* — Vivacqua Crane, PLLC

(57) ABSTRACT

A data forwarding method and apparatus, a chip, and a non-transitory computer-readable storage medium are disclosed. The method may include: determining, according to a data switching request, an interface to be switched off and a target interface to be switched to (S110), where the interface to be switched off and the target interface to be switched to send same data and include a same number of data ports; and controlling, according to timestamp jumping points of the data ports included in the interface to be switched off and the target interface to be switched to, data forwarded to an optical transport network to be switched from the interface to be switched off to the target interface to be switched to (S120).

20 Claims, 3 Drawing Sheets

(56) References Cited

U.S. PATENT DOCUMENTS

| | | | |
|---|---|---|---|
| 2013/0114953 A1 | 5/2013 | Moynihan et al. | |
| 2017/0005742 A1* | 1/2017 | Gareau | H04J 3/1658 |
| 2017/0310387 A1* | 10/2017 | Cai | H04Q 11/0005 |
| 2020/0092023 A1* | 3/2020 | Brown | H04L 5/1469 |

FOREIGN PATENT DOCUMENTS

| | | |
|---|---|---|
| CN | 102684810 A | 9/2012 |
| CN | 104660326 A | 5/2015 |
| CN | 104914853 A | 9/2015 |
| CN | 105743565 A | 7/2016 |
| CN | 107018081 A | 8/2017 |

OTHER PUBLICATIONS

International Searching Authority. International Search Report and Written Opinion for PCT Application No. PCT/CN2021/090736 and English translation, mailed Jul. 16, 2021, pp. 1-9.

The State Intellectual Property Office of People's Republic of China. First Office Action for CN Application No. 202010561037.7 and English translation, mailed Feb. 3, 2024, pp. 1-8.

The State Intellectual Property Office of People's Republic of China. First Search Report for CN Application No. 202010561037.7 and English translation, mailed Feb. 1, 2024, pp. 1-8.

\* cited by examiner

DATA ACCESS METHOD AND APPARATUS, CHIP AND COMPUTER STORAGE MEDIUM

CROSS-REFERENCE TO RELATED APPLICATION

This application is a national stage filing under 35 U.S.C. § 371 of international application number PCT/CN2021/090736, filed Apr. 28, 2021, which claims priority to Chinese patent application No. 202010561037.7 filed Jun. 18, 2020. The contents of these applications are incorporated herein by reference in their entirety.

TECHNICAL FIELD

Embodiments of the present disclosure relate to the technical field of data communication, and in particular, to a data forwarding method and apparatus, a chip, and a non-transitory computer-readable storage medium.

BACKGROUND

High-quality 5G bearer networks are the cornerstone for the development of 5G services. Optical Transport Network (OTN) bearer network technology has become more and more widely used in the 5G market in recent years due to its advantages of high bandwidth and high quality. In the process of data forwarding, the OTN provides a 1+1 channel protection mode to ensure the quality of data communication. The 1+1 channel protection mode is a protection mode of dual feed and selective receiving. To be specific, same data information is sent on main and standby channels, and the receiving end switches between receiving the data information from the main channel and receiving the data information from the standby channel according to the channel status, so as to ensure the data quality.

When the OTN bears a multi-port data service, the quality of data forwarded needs to be ensured. Such implementation requirements are difficult to achieve in some cases.

SUMMARY

Embodiments of the present disclosure provide a data forwarding method and apparatus, a chip, and a non-transitory computer-readable storage medium, to improve the accuracy of forwarded data.

In accordance with an aspect of the present disclosure, an embodiment provides a data forwarding method. The method may include: determining, according to a data switching request, an interface to be switched off and a target interface to be switched to, where the interface to be switched off and the target interface to be switched to send same data and include a same number of data ports; and controlling, according to timestamp jumping points of the data ports included in the interface to be switched off and the target interface to be switched to, data forwarded to an optical transport network to be switched from the interface to be switched off to the target interface to be switched to.

In accordance with another aspect of the present disclosure, an embodiment provides a data forwarding apparatus. The apparatus may include: a determining module, configured for determining, according to a data switching request, an interface to be switched off and a target interface to be switched to, where the interface to be switched off and the target interface to be switched to send same data and include a same number of data ports; and a control module, configured for controlling, according to timestamp jumping points of the data ports included in the interface to be switched off and the target interface to be switched to, data forwarded to an optical transport network to be switched from the interface to be switched off to the target interface to be switched to.

In accordance with another aspect of the present disclosure, an embodiment provides a chip. The chip may include: a processing unit; and a storage unit, configured for storing one or more programs which, when executed by the processing unit, cause the processing unit to implement the data forwarding method described above.

In accordance with another aspect of the present disclosure, an embodiment provides a non-transitory computer-readable storage medium, storing a computer program which, when executed by a processing unit, causes the processing unit to implement the data forwarding method described above.

DETAILED DESCRIPTION

The present disclosure is further described in detail below with reference to the accompanying drawings and embodiments. It should be understood that the specific embodiments described herein are merely used for illustrating the present disclosure, and are not intended to limit the present disclosure. In addition, it should be noted that, for the convenience of description, the drawings only show some but not all the structures related to the present disclosure. Moreover, the embodiments of the present disclosure and the features in the embodiments may be combined with each other without conflict.

Figure 1:
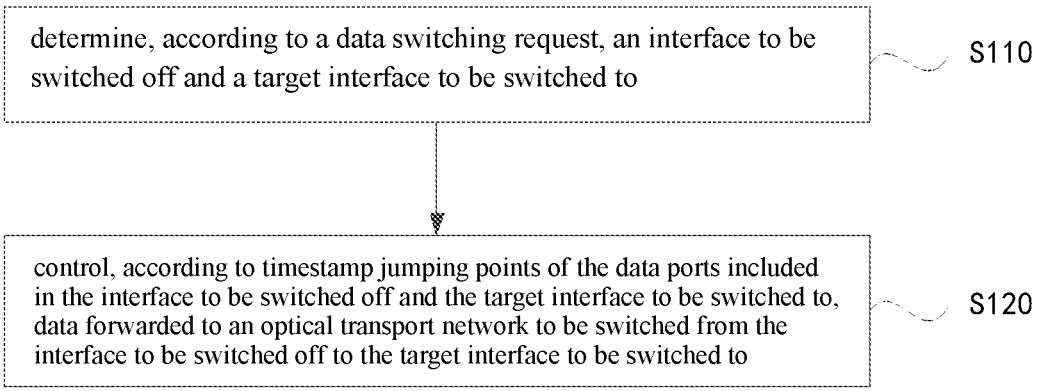
FIG. 1 is a flowchart of a data forwarding method according to an embodiment of the present disclosure.

FIG. 1 is a flowchart of a data forwarding method according to an embodiment of the present disclosure. The embodiment can be applied to forward data of an external device to a device in an OTN, for use by the device in the OTN. The type of data is not limited in the embodiments. For example, the data may be service data sent by an external device. The external device is connected to the device in the OTN through a chip. The chip is integrated on the device in the OTN to forward the service data sent by the external device to the OTN. The method may be performed by a data forwarding apparatus. The apparatus may be implemented by software and/or hardware, and may be integrated in a chip. The chip may be a transmission chip with a data processing function. Referring to FIG. 1, the method includes the following steps S110 to S120.

At S110, an interface to be switched off and a target interface to be switched to are determined according to a data switching request.

The interface to be switched off and the target interface to be switched to send same data and include a same number of data ports. The chip in the embodiment has two data interfaces, configured for receiving data from an external device. The data received by the two data interfaces are exactly the same, but the chip finally outputs only one of the two pieces of data to the OTN. Each data interface corresponds to one channel. In order to improve the transmission rate or meet a multi-service transmission requirement, generally multiple data ports are set in each channel, and data is transmitted through the multiple data ports. In the embodiment, the two data interfaces each including multiple data ports, and the numbers of data ports in the two data interfaces being the same are taken as an example. For example, data interface 0 and data interface 1 both include 10 data ports, which are 0-1 to 0-10, 1-1 to 1-10, respectively. Data of each data port in data interface 0 is the same as the data of each data port in data interface 1. For example, the data in data port 0-1 is the same as the data in data port 1-1. The data finally forwarded to the OTN may entirely come from data interface 0, or may entirely come from data interface 1, or may partly from data interface 0 and partly from data interface 1.

When there is a data switching request, the two data interfaces are respectively defined as an interface to be switched off and a target interface to be switched to. The interface to be switched off is a data interface currently to be switched off. The target interface to be switched to is a target data interface to be switched to. The interface to be switched off and the target interface to be switched to are not fixed. For example, the interface to be switched off can be data interface 0 or data interface 1. When the interface to be switched off is data interface 0, the target interface to be switched to is data interface 1. When the interface to be switched off is data interface 1, the target interface to be switched to is data interface 0. The data switching request is a request message obtained by the chip for switching between the data interfaces to output data to the OTN. The specific manner in which the data switching request is obtained is not limited in the embodiments. In one case, the data switching request may be obtained by detecting a state of a hardware switch of the external device. For example, the data switching request is obtained upon detecting that the hardware switch of the external device is on. The hardware switch may be controlled manually or automatically. In another case, an enable signal for data switching may be preset, and the level of the enable signal is controlled to be high or low by software. For example, the data switching request is obtained upon detecting that the enable signal is high. In still another case, the data switching request may be sent directly by a client. The client can be an intelligent terminal such as a mobile phone and a computer. The client can communicate with the chip. In an embodiment, after the data switching request is obtained, the data interface corresponding to data being currently outputted to the OTN may be used as the interface to be switched off, the other data interface used as the target interface to be switched to.

At S120, according to timestamp jumping points of the data ports included in the interface to be switched off and the target interface to be switched to, data forwarded to an optical transport network is controlled to be switched from the interface to be switched off to the target interface to be switched to.

The external device generally sends data to the two data interfaces of the chip in the form of a data packet. The data packet in the embodiment is, for example, an OTN Over Packet Fabric Protocol (OFP) packet, indicating that the data packet is sent based on the OFP protocol. A header of the protocol contains a 16-bit Timestamp field with a timestamp value of t μs. These timestamp values generally increment from minimum to maximum, then jump to minimum, and then cyclically increment from minimum to maximum. In some examples, t is 125 μs. The timestamp jumping point is the point at which the timestamp value jumps from maximum to minimum. The timestamp values of each pair of corresponding data ports in the two data interfaces are the same, and the timestamp jumping points of the data ports in the same data interface may be the same or different. The data ports containing the same data in the two data interfaces have different timestamp jumping points. For example, data port 0-1 of data interface 0 corresponds to data port 1-1 of data interface 1, and the timestamp jumping point for data port 0-1 is different from the timestamp jumping point for data port 1-1. The OFP packet is a fragment of a time-division multiplexing (TDM) packet. In the embodiment, the data packets of each data port may also be TDM packets.

Figure 2:
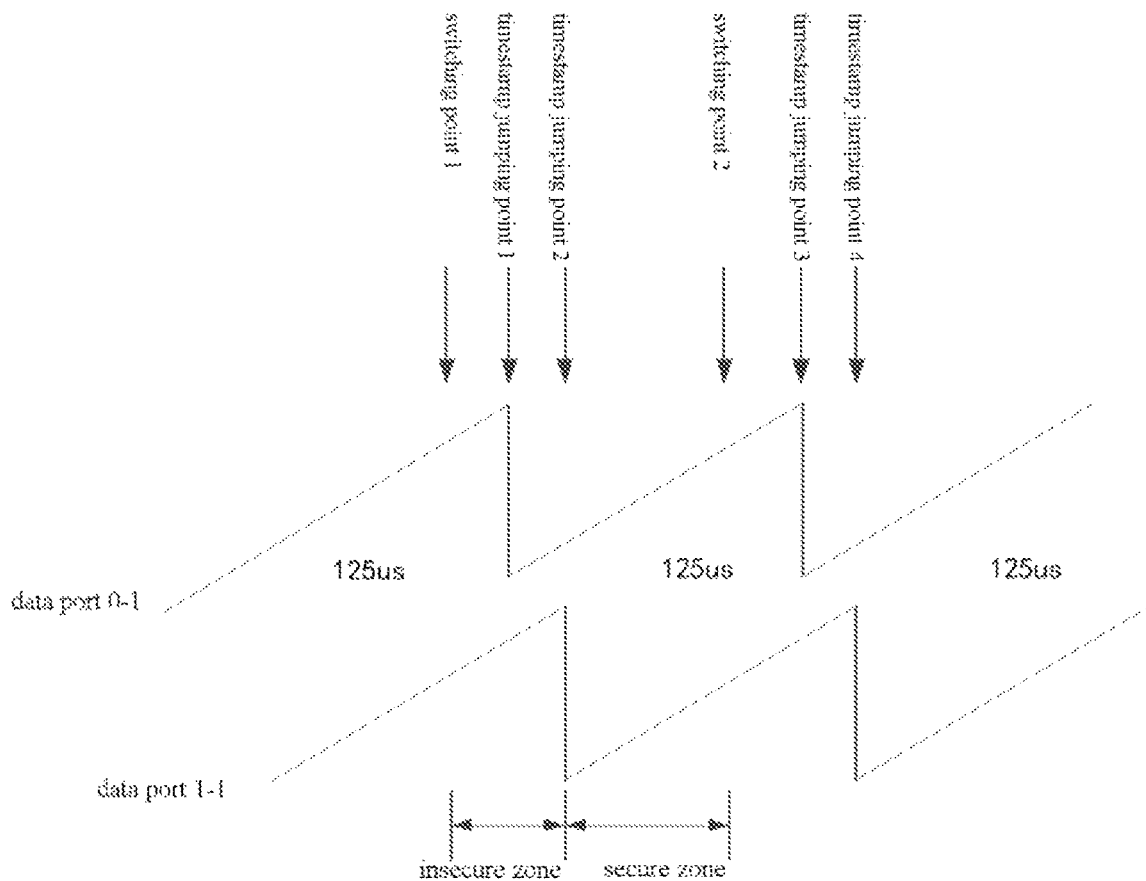
FIG. 2 is a schematic diagram of timestamp jumping of a data port according to an embodiment of the present disclosure.

FIG. 2 is a schematic diagram of timestamp jumping of a data port according to an embodiment of the present disclosure.

FIG. 2 exemplarily shows timestamp jumping of data ports containing the same data in the two data interfaces. For example, T is 125 μs. That is to say, jumping occurs every 125 μs. Timestamp jumping point 1 and timestamp jumping point 3 are timestamp jumping points of data port 0-1, that is, moments at which the timestamp value of data port 0-1 jumps from 125 μs to 0 μs. Timestamp jumping point 2 and timestamp jumping point 4 are timestamp jumping points of data port 1-1. If a timestamp jumping point appears between a switching point and another timestamp jumping point within a time T, a consideration is made that the time between the switching point and the another timestamp jumping point is an insecure zone where no switching is allowed. T can be pre-configured by the chip. FIG. 2 exemplarily shows two switching points, namely, switching point 1 and switching point 2. When the timestamp jumping point 1 appears between the switching point 1 and the timestamp jumping point 2 within the time T, the time between the switching point 1 and the timestamp jumping point 2 is an insecure zone where no data switching is allowed. If no timestamp jumping point appears between the timestamp jumping point 2 and the switching point 2 within the time T, the time between the timestamp jumping point 2 and the switching point 2 is a secure zone where data switching is allowed. The timestamp jumping of each data port exhibits a periodic characteristic, that is, timestamp jumping occurs every 125 μs.

If data switching occurs in an insecure zone, data loss will occur, resulting in incompletion of the data forwarded to the OTN, affecting the accuracy of the data forwarded, and thus affecting the use of the data by the device in the OTN. Therefore, in the embodiment, the data forwarded is controlled to be switched from the interface to be switched off to the target interface to be switched to according to the timestamp jumping point of each data port, so as to ensure the accuracy of the data forwarded. Since each data interface includes multiple data ports, in one case, when a detection is made that the data port to be switched off and the target data port have reached respective timestamp jumping points, the data forwarded can be switched from the port to be switched off to the target port to be switched to, until all data ports in the interface to be switched off have been switched to the data ports in the target interface to be switched to, thereby completing the switching from the interface to be switched off to the target interface to be switched to. Of course, part of the data ports may be selected for switching, and when the switching of this part of data ports is completed, it means that the data interface switching is completed. The number of and the method for selecting this part of data ports are not limited in the embodiments.

An embodiment of the present disclosure provides a data forwarding method. The method includes: determining, according to a data switching request, an interface to be switched off and a target interface to be switched to, where the interface to be switched off and the target interface to be switched to send same data and include a same number of data ports; and controlling, according to timestamp jumping points of the data ports included in the interface to be switched off and the target interface to be switched to, data forwarded to an optical transport network to be switched from the interface to be switched off to the target interface to be switched to. The above method considers the timestamp jumping points of the data ports in the interface to be switched off and the target interface to be switched to when performing interface switching, which prevents data loss during interface switching and ensures the accuracy of data forwarded.

Figure 3:
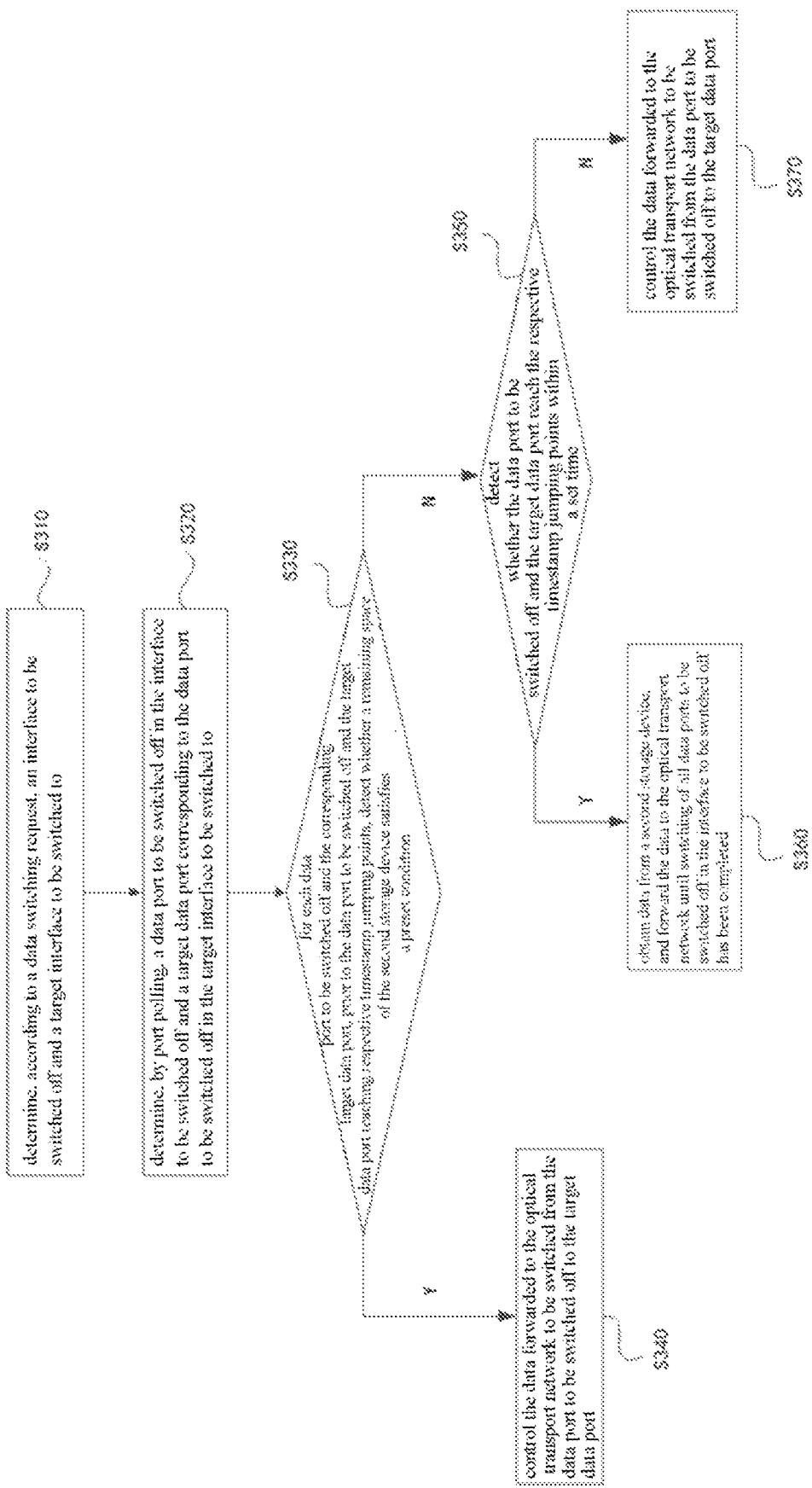
FIG. 3 is a flowchart of another data forwarding method according to an embodiment of the present disclosure.

FIG. 3 is a flowchart of another data forwarding method according to an embodiment of the present disclosure. The method may include following steps S310 to S370.

At S310, an interface to be switched off and a target interface to be switched to are determined according to a data switching request.

At S320, a data port to be switched off in the interface to be switched off and a target data port corresponding to the data port to be switched off in the target switch interface are determined by port polling.

The port polling method can ensure that each data port has an equal opportunity to access the OTN. For example, the interface to be switched off includes 10 data ports, which are numbered 0-1 to 0-10, respectively. In one case, the switching may be performed based on an order of the serial numbers of the data ports. For example, data port 0-1 is switched first, then data port 0-2 is switched, and so on, until data port 0-10 is switched. In another case, the switching order may be selected according to data content.

At S330, for each data port to be switched off and the corresponding target data port, prior to the data port to be switched off and the target data port reaching their respective timestamp jumping points, a detection is made as to whether a remaining space of a second storage device satisfies a preset condition. If yes, S340 is executed; otherwise, S350 is executed.

The timestamp jumping point of each data port may be determined according to a timestamp value corresponding to an OFP packet in the data port. For example, when the timestamp value is 125 µs, the corresponding timestamp jumping point is a moment at which the timestamp value jumps from 125 us to 0 µs. The second storage device is configured for storing data to be switched in the target data port. The storage device in the embodiment is, for example, a first input first output (fifo) memory. For example, there are four fifo memories, namely fifo_chg_0, fifo_chg_1, fifo_if_0, and fifo_if_1. fifo_chg is configured for storing current to-be-switched data. For example, fifo_chg_0 is configured for storing a current to-be-switched OFP packet of the data port to be switched off, and fifo_chg_1 is configured for storing a current to-be-switched OFP packet of the target data port. fifo_if is configured for storing data before switching. For example, fifo_if_0 is configured for storing data of the interface to be switched off before switching, and fifo_if_1 is configured for storing data of the target interface to be switched to before switching. Of course, fifo_chg_0 and fifo_chg_1 may be interchanged. That is to say, fifo_chg_0 may also be configured for storing the current to-be-switched OFP packet of the target data port, and fifo_chg_1 may also store the current to-be-switched OFP packet of the data port to be switched off. fifo_if_0 and fifo_if_1 may also be interchanged. In the embodiment, for example, fifo_chg_0 stores the current to-be-switched OFP packet of the data port to be switched off, fifo_chg_1 stores the current to-be-switched OFP packet of the target data port, fifo_if_0 stores the data of the interface to be switched off before switching, and fifo_if_1 stores the data of the target interface to be switched to before switching. In this example, fifo_chg_0 is defined as a first storage device and fifo_chg_1 is defined as a second storage device.

In the embodiment, delay protection is provided for the data ports. For example, prior to switching, a remaining space of fifo_chg_1 is detected. If a detection is made that the remaining space of fifo_chg_1 meets a preset condition, it is considered that fifo_chg_1 is in a full state, and switching from the data port to be switched off to the target data port is forcibly performed, and a full interrupt is reported at the same time. The preset condition may be that the remaining space is 0 or the remaining space is less than a preset space threshold. The preset space threshold is a small positive number. The specific value of the preset space threshold is not limited in the embodiment.

At S340, the data forwarded to the optical transport network is controlled to be switched from the data port to be switched off to the target data port.

At S350, a detection is made as to whether the data port to be switched off and the target data port reach respective timestamp jumping points within a set time. If yes, S360 is executed; otherwise, S370 is executed.

In the embodiment, in addition to delay protection, timeout protection is also set. To be specific, if there is still space available in fifo_chg_1 before switching, a further detection is made as to whether the data port to be switched off and the target data port reach respective timestamp jumping points within the set time. If at least one of the data port to be switched off and the target data port does not reach respective timestamp jumping point, switching from the data port to be switched off to the target data port is forcibly performed, and a timeout interrupt is reported; otherwise, switching is performed as normal. The length of the set time may be configured as required, and a minimum value of the length of the set time is the timestamp value.

At S360, data is obtained from a second storage device, and the data is forwarded to the optical transport network until switching of all data ports to be switched off in the interface to be switched off is completed.

Taking the switching of data port 0-1 of the interface to be switched off to data port 1-1 of the target interface to be switched to as an example, when a detection is made that data port 0-1 and data port 1-1 reach respective timestamp jumping points, data buffered in fifo_chg_1 is forwarded to the OTN. In this case, fifo_chg_0 may be reset, that is, data stored in fifo_chg_0 may be cleared or discarded, so as to provide space for storing to-be-switched data of a next data port to be switched off. It should be noted that when the data buffered in fifo_chg_1 is forwarded to the OTN, fifo_if_0 and fifo_if_1 remain in an idle state, that is, fifo_if_0 and fifo_if_1 currently neither buffer data nor have data forwarded to the OTN. In order to ensure that each data port has an equal opportunity to access the OTN, in the embodiment, all data ports of the interface to be switched off are polled. That is, after the switching of a current data port is completed, switching of a next data port is performed. The above operations are repeated until the switching of all the data ports of the interface to be switched off is completed. When the switching of all the data ports is completed, it means that the data interface switching is completed. It should also be noted that only one data port is switched each time. After the data interface switching is completed, data that does not need to be switched is forwarded from fifo_if_0 or fifo_if_1 to the OTN. For example, the interface to be switched off is data interface 0, and a corresponding memory is fifo_if_0; the target data interface is data interface 1, and a corresponding memory is fifo_if_1. Then, after the switching is completed, data in fifo_if_1 is forwarded to the OTN.

At S370, the data forwarded to the optical transport network is controlled to be switched from the data port to be switched off to the target data port.

In the data forwarding method provided in the embodiment, on the basis of the above-mentioned embodiments, each data port of the interface to be switched is polled so that each data port has an equal opportunity to access the OTN, and when the data ports are switched, the switching point is determined according to the timestamp jumping points of the data port to be switched off and the target data port, thereby avoiding data loss caused due to data switching in the insecure zone, and ensuring the accuracy of the data forwarded. In addition, delay protection and timeout protection are set to ensure that the system will not be stuck when no timestamp jumping point can be detected.

On the basis of the above embodiments, in the embodiment, when a detection is made that a data port to be switched off reaches a timestamp jumping point, data of the data port to be switched off is buffered to the first storage device; and when a detection is made that a target data port reaches a timestamp jumping point, data of the target data port is buffered to the second storage device, where the first storage device is configured for storing data to be switched in the data port to be switched off.

The first storage device may be fifo_chg_0 provided in the above embodiments, and is configured for storing data to be switched in the data port to be switched off. The second storage device may be fifo_chg_1 provided in the above embodiments, and is configured for storing data to be switched in the target data port. Compared with conventional technologies where one storage device is provided for each data port, in the embodiment, in a case that there are multiple data ports, one memory fifo_chg_0 is used to buffer the to-be-switched data of each data port to be switched off, one memory fifo_chg_1 is used to buffer the to-be-switched data of each target data port, one memory fifo_if_0 and one memory fifo_if_1 are used to respectively buffer the data that does not need to be switched in the corresponding data ports, thereby reducing the number of storage devices and the occupation of hardware resources.

In an embodiment, taking the switching of data port 0-1 of the interface to be switched off to data port 1-1 of the target interface to be switched to as an example, when a detection is made that data port 0-1 reaches its timestamp jumping point, the OFP packet in data port 0-1 is written to fifo_chg_0, and when a detection is made that data port 1-1 reaches its timestamp jumping point, the OFP packet in data port 1-1 is written to fifo_chg_1. When a detection is made that data port 0-1 and data port 1-1 both reach their respective timestamp jumping points, the data buffered in fifo_chg_1 is forwarded to the OTN, and fifo_chg_0 is reset. After the switching is completed, both fifo_chg_1 and fifo_chg_0 are empty, and can continue to provide storage space for a next switching. In the embodiment, the occupation of hardware resources is further reduced while ensuring that each data port has an equal opportunity to access the OTN.

On the basis of the above embodiments, prior to the controlling, according to timestamp jumping points of the data ports included in the interface to be switched off and the target interface to be switched to, data forwarded to an optical transport network to be switched from the interface to be switched off to the target interface to be switched to, the method further includes:

disabling the data ports in the interface to be switched off, and enabling the data ports in the target interface to be switched to.

Taking the switching from data interface 0 to data interface 1 as an example, initially, each data port of data interface 0 is disabled (i.e., the enable signal is low), and each data port of data interface 1 is enabled (i.e., the enable signal is high). Assuming that the number of the current data port to be switched off is 0-1 and the number of the target data port is 1-1, when a detection is made that data port 0-1 reaches its timestamp jumping point, the OFP packet is written to fifo_chg_0, and data port 0-1 is enabled (i.e., the enable signal is high). When both fifo_chg_0 and fifo_chg_1 are empty, and there is no OFP packet inputted into data interface 1, data port 1-1 is disabled. At this moment, it is considered that the switching from data port 0-1 to data port 1-1 is successful.

On the basis of the above embodiments, after the controlling, according to timestamp jumping points of the data ports included in the interface to be switched off and the target interface to be switched to, data forwarded to an optical transport network to be switched from the interface to be switched off to the target interface to be switched to, the method further includes:

enabling the data ports in the interface to be switched off, and disabling the data ports in the target interface to be switched to.

Still taking switching from data interface 0 to data interface 1 as an example, after switching of all data ports is completed, the data ports of data interface 0 are enabled, and the data ports of data interface 1 are disabled, to wait for a next switching.

It should be noted that, in the above embodiments, the operations are executed when no alarm signal related to the data ports is received or when a detection is made that all alarm signals related to the data ports disappear. Of course, if an alarm signal is detected on a data port, the switching operation is performed directly on this data port, and data of the data ports for which no alarm is detected is forwarded to the OTN, to ensure the quality of the data forwarded.

The implementation process of the data forwarding method is described below with reference to an example.

Example One: Switching from Data Interface 0 to Data Interface 1, where Each of the Data Interface 0 and Data Interface 1 Includes N Data Ports Initially, data of data interface 0 is forwarded to the OTN. In this case, the N data ports of data interface 0 are all disabled, and the N data ports of data interface 1 are all enabled. When a data switching request is received, the data ports are polled. Assuming that a number of a current port to be switched off is 0-1, when a detection is made that data port 0-1 reaches its timestamp jumping point, the OFP packet is written to fifo_chg_0, and at the same time data port 0-1 is enabled. When a detection is made that data interface 1 reaches its timestamp jumping point, the OFP packet is written to fifo_chg_1. When a detection is made that both data interface 0 and data interface 1 reach their respective timestamp jumping points, fifo_chg_0 is reset. When fifo_if_0 and fifo_if_1 are idle, the data in fifo_chg_1 is forwarded to the OTN. When both fifo_chg_0 and fifo_chg_1 are empty, and there is no OFP packet inputted into data port 1, data port 1-1 is disabled. At this moment, it is considered that the switching of data port 0-1 is successful. Then, a next data port to be switched off is determined, and the above steps are repeated until the switching of all the N data ports are completed. After the switching of all the N data ports is completed, all the N data ports of data interface 0 are enabled, and all the N data ports of data interface 1 are disabled. If a delay or timeout occurs during the switching process, forced switching is performed.

The data forwarding method provided in the embodiment effectively solves the problem of 1+1 protection of multiple data ports in an ONT. When two data interfaces have multiple data ports, the use of the port polling mechanism in the case of multiple data ports allows each data port to have an equal opportunity to access the OTN, and there is no need to set a storage device for each data port, thereby reducing the occupation of hardware resources. The jumping of the timestamp value is used to ensure the accurate reception of data. Moreover, each data port is provided with a timeout protection mechanism to ensure that the system will not be stuck when no timestamp jumping point is found.

Figure 4:
FIG. 4 is a structural diagram of a data forwarding apparatus according to an embodiment of the present disclosure.

FIG. 4 is a schematic structural diagram of a data forwarding apparatus according to an embodiment of the present disclosure. The apparatus can perform the data forwarding method of the above embodiments. Referring to FIG. 4, the apparatus includes a determining module 41, and a first control module 42.

The determining module 41 is configured for determining, according to a data switching request, an interface to be switched off and a target interface to be switched to, where the interface to be switched off and the target interface to be switched to send same data and include a same number of data ports.

The first control module 42 is configured for controlling, according to timestamp jumping points of the data ports included in the interface to be switched off and the target interface to be switched to, data forwarded to an optical transport network to be switched from the interface to be switched off to the target interface to be switched to.

An embodiment of the present disclosure provides a data forwarding apparatus. The apparatus is configured for: determining, according to a data switching request, an interface to be switched off and a target interface to be switched to, where the interface to be switched off and the target interface to be switched to send same data and include a same number of data ports; and controlling, according to timestamp jumping points of the data ports included in the interface to be switched off and the target interface to be switched to, data forwarded to an optical transport network to be switched from the interface to be switched off to the target interface to be switched to. The apparatus considers the timestamp jumping points of the data ports in the interface to be switched off and the target interface to be switched to when performing interface switching, which prevents data loss during interface switching and ensures the accuracy of data forwarded.

On the basis of the above embodiments, the first control module 42 includes a polling unit and a first control unit.

The polling unit is configured for determining a data port to be switched off in the interface to be switched off and a target data port corresponding to the data port to be switched off in the target interface to be switched to by port polling.

The first control unit is configured for: for each data port to be switched off and the corresponding target data port, when a detection is made that the data port to be switched off and the target data port reach their respective timestamp jumping points, obtaining data from a second storage device, and forwarding the data to the optical transport network until switching of all data ports to be switched off in the interface to be switched off is completed, where the second storage device is configured for storing data to be switched in the target data port.

On the basis of the above embodiments, the first control module 42 further includes a buffer unit.

The buffer unit is configured for: when a detection is made that a data port to be switched off reaches the timestamp jumping point, buffering data of the data port to be switched off to a first storage device; and when a detection is made that a target data port reaches the timestamp jumping point, buffering data of the target data port to the second storage device, where the first storage device is configured for storing data to be switched in the data port to be switched off.

On the basis of the above embodiments, the first control module 42 further includes a second control unit.

The second control unit is configured for: when a detection is made that a data port to be switched off and/or a target data port reaches a respective timestamp jumping point within a set time, controlling the data forwarded to the optical transport network to be switched from the data port to be switched off to the target data port.

On the basis of the above embodiments, the first control module 42 further includes a third control unit.

The third control unit is configured for: prior to the data port to be switched off and the target data port reaching their respective timestamp jumping points, controlling the data forwarded to the optical transport network to be switched from the data port to be switched off to the target data port if a detection is made that a remaining space of the second storage device satisfies a preset condition.

On the basis of the above embodiments, the apparatus further includes a second control module.

The second control module is configured for disabling the data ports in the interface to be switched off and enabling the data ports in the target interface to be switched to, prior to controlling, according to the timestamp jumping points of the data ports included in the interface to be switched off and the target interface to be switched to, the data forwarded to the optical transport network to be switched from the interface to be switched off to the target interface to be switched to.

On the basis of the above embodiments, the apparatus further includes a third control module.

The third control module is configured for enabling the data ports in the interface to be switched off, and disabling the data ports in the target interface to be switched to, after controlling, according to the timestamp jumping points of the data ports included in the interface to be switched off and the target interface to be switched to, the data forwarded to the optical transport network to be switched from the interface to be switched off to the target interface to be switched to.

On the basis of the above embodiments, the timestamp jumping points of the corresponding data ports in the interface to be switched off and the target interface to be switched to are at different moments.

The data forwarding apparatus provided in the embodiments of the present disclosure can perform the data forwarding method in the above embodiments, and has functional modules and beneficial effects corresponding to the method performed.

Figure 5:
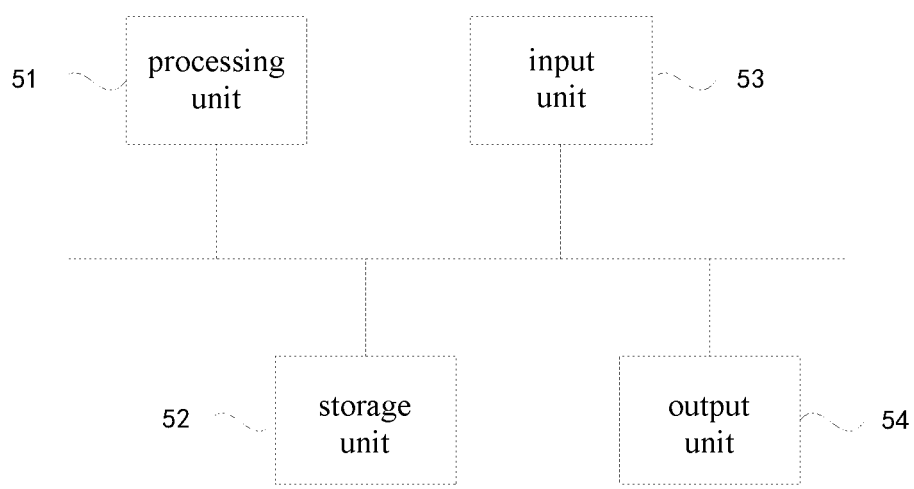
FIG. 5 is a structural diagram of a chip according to an embodiment of the present disclosure.

FIG. 5 is a structural diagram of a chip according to an embodiment of the present disclosure.

The chip includes a processing unit 51, a storage unit 52, an input unit 53, and an output unit 54. The number of processing units 51 in the chip may be one or more. One processing unit 51 is taken as an example in FIG. 5. The processing unit 51, the storage unit 52, the input unit 53, and the output unit 54 may be connected by a bus or in other ways. Connection by a bus is taken as an example in FIG. 5.

The storage unit 52, as a computer-readable storage medium, may be configured for storing a software program, a computer-executable program, and modules, for example, program instructions/modules corresponding to the data forwarding method in the embodiments of the present disclosure. The software programs, instructions, and modules stored in the storage unit 52, when executed by the processing unit 51, cause the processing unit 51 to execute various functional applications and data processing of the chip, i.e., implements the data forwarding method in the above embodiments.

The storage unit 52 mainly includes a program storage area and a data storage area. The program storage area may store an operating system, and an application required by at least one function. The data storage area may store data created according to the use of the terminal and the like. In addition, the storage unit 52 may include a high speed random access memory, and may also include a nonvolatile memory, e.g., at least one magnetic disk storage device, flash memory device, or other nonvolatile solid-state storage device. In some examples, the storage unit 52 may further include memories located remotely from the processing unit 51, and the remote memories may be connected to the chip via a network. Examples of the network include, but not limited to, the Internet, an intranet, a local area network, a mobile communication network, and combinations thereof.

The input unit 53 may be configured for receiving inputted numerical or character information, and generating a key signal input related to user settings and function control of the chip. The output unit 54 may include a display device such as a display screen and an audio device such as a speaker or a buzzer.

The chip provided in the embodiments of the present disclosure and the data forwarding method provided in the above embodiments belong to the same concept. For technical details that are not described in detail in the embodiment, reference may be made to the above embodiments. The embodiment has the same beneficial effects as the execution of the data forwarding method.

An embodiment of the present disclosure further provides a computer-readable storage medium, storing a computer program which, when executed by a processing unit, causes the processing unit to implement the data forwarding method described in the embodiments of the present disclosure.

Of course, for the storage medium containing the computer-executable instructions that is provided in the embodiments of the present disclosure, the computer-executable instructions are not limited to the operations in the above data forwarding method, and can also perform the related operations in the data forwarding method provided in any one of the embodiments of the present disclosure, to achieve the corresponding functions and beneficial effects.

Embodiments of the present disclosure provide a data forwarding method and apparatus, a chip, and a computer-readable storage medium. The method includes: determining, according to a data switching request, an interface to be switched off and a target interface to be switched to, where the interface to be switched off and the target interface to be switched to send same data and include a same number of data ports; and controlling, according to timestamp jumping points of the data ports included in the interface to be switched off and the target interface to be switched to, data forwarded to an optical transport network to be switched from the interface to be switched off to the target interface to be switched to. In the above embodiments, the timestamp jumping points of the data ports in the interface to be switched off and the target interface to be switched to are considered when interface switching is performed, which prevents data loss during interface switching and ensures the accuracy of data forwarded.

From the above detailed description of the embodiments, those having ordinary skill in the art can clearly understand that the present disclosure may be implemented by software and necessary general-purpose hardware, and of course may also be implemented by hardware, but in many cases, the former is a more feasible implementation. Based on such an understanding, the technical schemes in the embodiments of the present disclosure essentially or the part contributing in some cases may be embodied in the form of a software product. The computer software product may be stored in a computer-readable storage medium such as a floppy disk, a read-only memory (ROM), a random access memory (RAM), a flash memory, a hard disk, an optical disc, etc., of a computer, and includes several instructions for instructing a computer device (which may be a robot, a personal computer, a server, a network device, or the like) to perform the data forwarding method described in the embodiments of the present disclosure.

What is claimed is:

1. A data forwarding method for an Optical Transport Network (OTN), comprising:
    determining, according to a data switching request, an interface to be switched off and a target interface to be switched to, wherein the interface to be switched off and the target interface to be switched to send same data and comprise a same number of data ports;
    determining a data port to be switched off in the interface to be switched off and a target data port corresponding to the data port to be switched off in the target interface to be switched to by port polling;
    for each data port to be switched off and the corresponding target data port, in response to a detection that the data port to be switched off and the target data port reach respective timestamp jumping points, obtaining data from a second storage device; and
    forwarding the data to the OTN until switching of all data ports to be switched off in the interface to be switched off is completed, wherein the second storage device is configured to store data to be switched in the target data port.

2. The method of claim 1, further comprising:
    in response to a detection that a data port to be switched off reaches the timestamp jumping point, buffering data of the data port to be switched off to a first storage device; and
    in response to a detection that a target data port reaches the timestamp jumping point, buffering data of the target data port to the second storage device, wherein the first storage device is configured for storing data to be switched in the data port to be switched off.

3. The method of claim 1, further comprising:
in response to not detecting that a data port to be switched off and/or a target data port reaches a respective timestamp jumping point within a set time, controlling the data forwarded to the OTN to be switched from the data port to be switched off to the target data port.

4. The method of claim 1, further comprising:
prior to the data port to be switched off and the target data port reaching respective timestamp jumping points, controlling the data forwarded to the OTN to be switched from the data port to be switched off to the target data port, in response to a detection that a remaining space of the second storage device satisfies a preset condition.

5. The method of claim 1, wherein the forwarding the data to the OTN until switching of all data ports to be switched off in the interface to be switched off is completed, wherein the second storage device is configured to store data to be switched in the target data port further comprises:
disabling the data ports in the interface to be switched off, and
enabling the data ports in the target interface to be switched to.

6. The method of claim 1, wherein the forwarding the data to the OTN until switching of all data ports to be switched off in the interface to be switched off is completed, wherein the second storage device is configured to store data to be switched in the target data port further comprises:
enabling the data ports in the interface to be switched off, and
disabling the data ports in the target interface to be switched to.

7. The method of claim 1, wherein the timestamp jumping points of the corresponding data ports in the interface to be switched off and the target interface to be switched to are at different moments.

8. A chip, comprising:
a storage unit, configured for storing one or more programs; and
a processing unit, configured for executing the one or more programs to perform a data forwarding method for an Optical Transport Network (OTN), comprising:
determining, according to a data switching request, an interface to be switched off and a target interface to be switched to, wherein the interface to be switched off and the target interface to be switched to send same data and comprise a same number of data ports;
determining a data port to be switched off in the interface to be switched off and a target data port corresponding to the data port to be switched off in the target interface to be switched to by port polling;
for each data port to be switched off and the corresponding target data port, in response to a detection that the data port to be switched off and the target data port reach respective timestamp jumping points, obtaining data from a second storage device; and
forwarding the data to the OTN until switching of all data ports to be switched off in the interface to be switched off is completed, wherein the second storage device is configured to store data to be switched in the target data port.

9. The chip of claim 8, wherein the processing unit is further configured for executing the one or more programs to perform:
in response to a detection that a data port to be switched off reaches the timestamp jumping point, buffering data of the data port to be switched off to a first storage device; and
in response to a detection that a target data port reaches the timestamp jumping point, buffering data of the target data port to the second storage device, wherein the first storage device is configured for storing data to be switched in the data port to be switched off.

10. The chip of claim 8, wherein the processing unit is further configured for executing the one or more programs to perform:
in response to not detecting that a data port to be switched off and/or a target data port reaches a respective timestamp jumping point within a set time, controlling the data forwarded to the OTN to be switched from the data port to be switched off to the target data port.

11. The chip of claim 8, wherein the processing unit is further configured for executing the one or more programs to perform:
prior to the data port to be switched off and the target data port reaching respective timestamp jumping points, controlling the data forwarded to the OTN to be switched from the data port to be switched off to the target data port, in response to a detection that a remaining space of the second storage device satisfies a preset condition.

12. The chip of claim 8, wherein the processing unit is further configured for executing the one or more programs to perform:
disabling the data ports in the interface to be switched off, and
enabling the data ports in the target interface to be switched to.

13. The chip of claim 8, wherein the processing unit is further configured for executing the one or more programs to perform:
enabling the data ports in the interface to be switched off, and
disabling the data ports in the target interface to be switched to.

14. The chip of claim 8, wherein the timestamp jumping points of the corresponding data ports in the interface to be switched off and the target interface to be switched to are at different moments.

15. A computer non-transitory computer-readable storage medium, storing a computer program which, when executed by a processing unit, causes the processing unit to perform a data forwarding method for an Optical Transport Network (OTN), comprising:
determining, according to a data switching request, an interface to be switched off and a target interface to be switched to, wherein the interface to be switched off and the target interface to be switched to send same data and comprise a same number of data ports;
determining a data port to be switched off in the interface to be switched off and a target data port corresponding to the data port to be switched off in the target interface to be switched to by port polling;
for each data port to be switched off and the corresponding target data port, in response to a detection that the data port to be switched off and the target data port reach respective timestamp jumping points, obtaining data from a second storage device; and forwarding the data to the OTN until switching of all data ports to be switched off in the interface to be switched off is completed, wherein the second storage device is configured to store data to be switched in the target data port.

16. The computer non-transitory computer-readable storage medium of claim 15, wherein the processing unit is further configured for executing the one or more programs to perform:
   in response to a detection that a data port to be switched off reaches the timestamp jumping point, buffering data of the data port to be switched off to a first storage device; and
   in response to a detection that a target data port reaches the timestamp jumping point, buffering data of the target data port to the second storage device, wherein the first storage device is configured for storing data to be switched in the data port to be switched off.

17. The computer non-transitory computer-readable storage medium of claim 15, wherein the processing unit is further configured for executing the one or more programs to perform:
   in response to not detecting that a data port to be switched off and/or a target data port reaches a respective timestamp jumping point within a set time, controlling the data forwarded to the OTN to be switched from the data port to be switched off to the target data port.

18. The computer non-transitory computer-readable storage medium of claim 15, wherein the processing unit is further configured for executing the one or more programs to perform:
   prior to the data port to be switched off and the target data port reaching respective timestamp jumping points, controlling the data forwarded to the OTN to be switched from the data port to be switched off to the target data port, in response to a detection that a remaining space of the second storage device satisfies a preset condition.

19. The computer non-transitory computer-readable storage medium of claim 15, wherein the processing unit is further configured for executing the one or more programs to perform:
   disabling the data ports in the interface to be switched off, and
   enabling the data ports in the target interface to be switched to.

20. The computer non-transitory computer-readable storage medium of claim 15, wherein the processing unit is further configured for executing the one or more programs to perform:
   enabling the data ports in the interface to be switched off, and
   disabling the data ports in the target interface to be switched to.

\* \* \* \* \*